Figure 1:
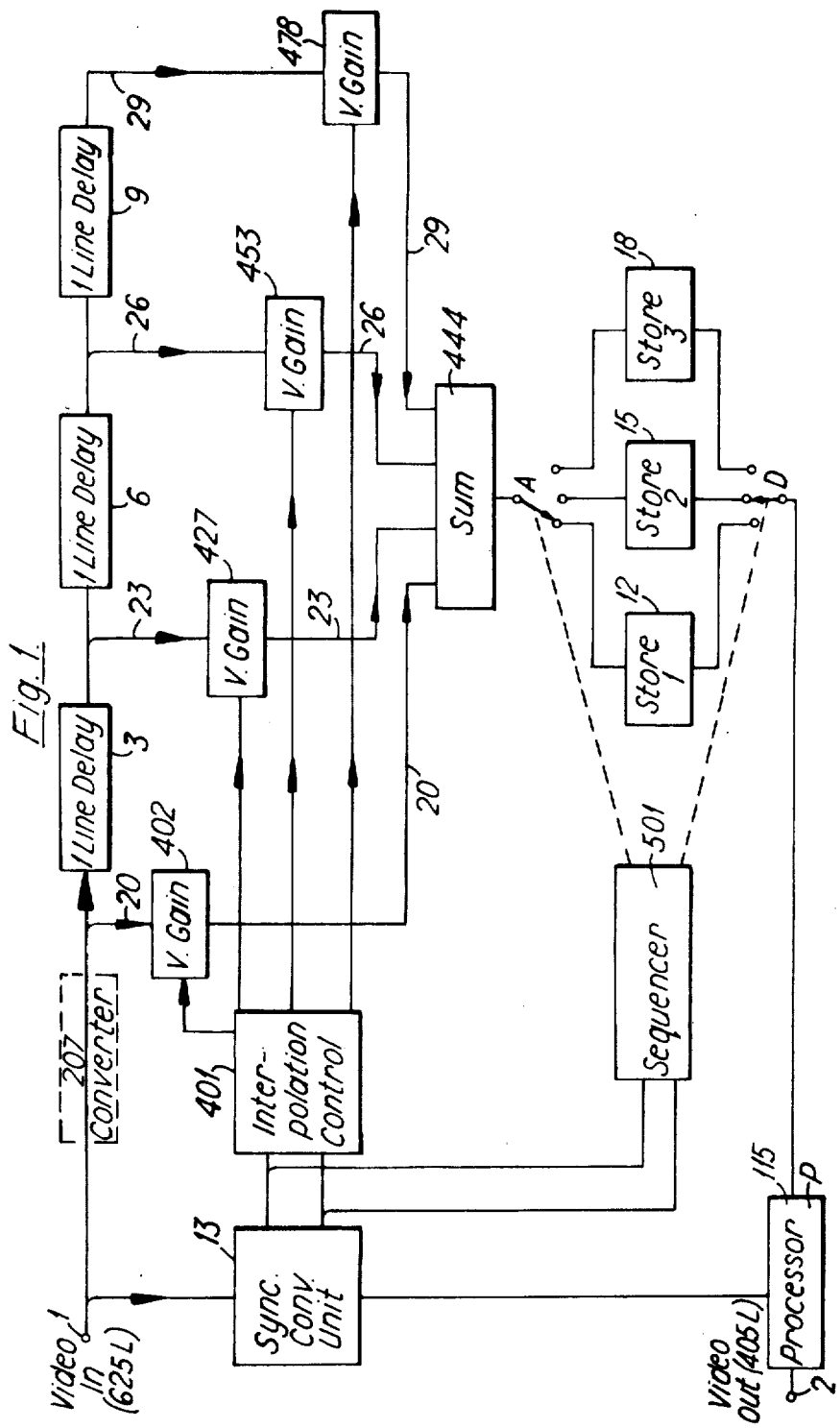

United States Patent [19]

Baldwin

[11] 4,051,531

[45] * Sept. 27, 1977

[54] TELEVISION SYSTEMS

[75] Inventor: John Lewis Edwin Baldwin, Croydon, England

[73] Assignee: Independent Broadcasting Authority, Great Britain

[*] Notice: The portion of the term of this patent subsequent to June 26, 1990, has been disclaimed.

[21] Appl. No.: 366,595

[22] Filed: June 4, 1973

Related U.S. Application Data

[62] Division of Ser. No. 126,538, March 22, 1971, Pat. No. 3,742,135.

[30] Foreign Application Priority Data

Mar. 26, 1970 United Kingdom ............... 14976/70

[51] Int. Cl.² ............................................ H04N 5/00
[52] U.S. Cl. ............................................ 358/140
[58] Field of Search ............... 178/DIG. 24, DIG. 3; 179/15.55 R, 15.55 T; 358/140

[56] References Cited

U.S. PATENT DOCUMENTS

| | | | |
|---|---|---|---|
| 3,299,204 | 1/1967 | Cherry | 178/6.8 |
| 3,366,739 | 1/1968 | Parkinson | 178/DIG. 3 |
| 3,457,369 | 7/1969 | Davies | 178/6.8 |
| 3,617,626 | 11/1971 | Bluth | 178/6.6 A |
| 3,739,083 | 6/1973 | Lieboff | 179/15.55 R |
| 3,742,135 | 6/1973 | Baldwin | 178/6.8 |
| 3,883,685 | 5/1975 | Yumde | 178/DIG. 3 |

FOREIGN PATENT DOCUMENTS 2,096,725   2/1974   France ..................... 178/DIG. 24

Primary Examiner—Robert L. Griffin
Assistant Examiner—Michael A. Masinick
Attorney, Agent, or Firm—A. W. Breiner

[57] ABSTRACT

Video input signals of a field of a first line standard are converted to a second line standard, having a reduced number of lines, via an intermediate line standard. The input signals are passed through one or more delay devices so that the picture information in corresponding parts of adjacent lines is available at any instant. By interpolation of this information there are produced lines of an intermediate standard which are stored. The intermediate standard contains the same number of lines as the first but the interpolated information is contained in the number of lines of the second standard. The excess lines of the intermediate standard may be blank. Output signals of the second standard are obtained by reading-out only the wanted lines of the intermediate standard.

In a modification, where the second standard has more lines than the first, lines are added when reading-out the intermediate standard.

The apparatus is preferably of the digital type for all steps of the conversion. The novel use of digital shift registers as delay devices and storage devices is especially convenient and economic.

2 Claims, 8 Drawing Figures

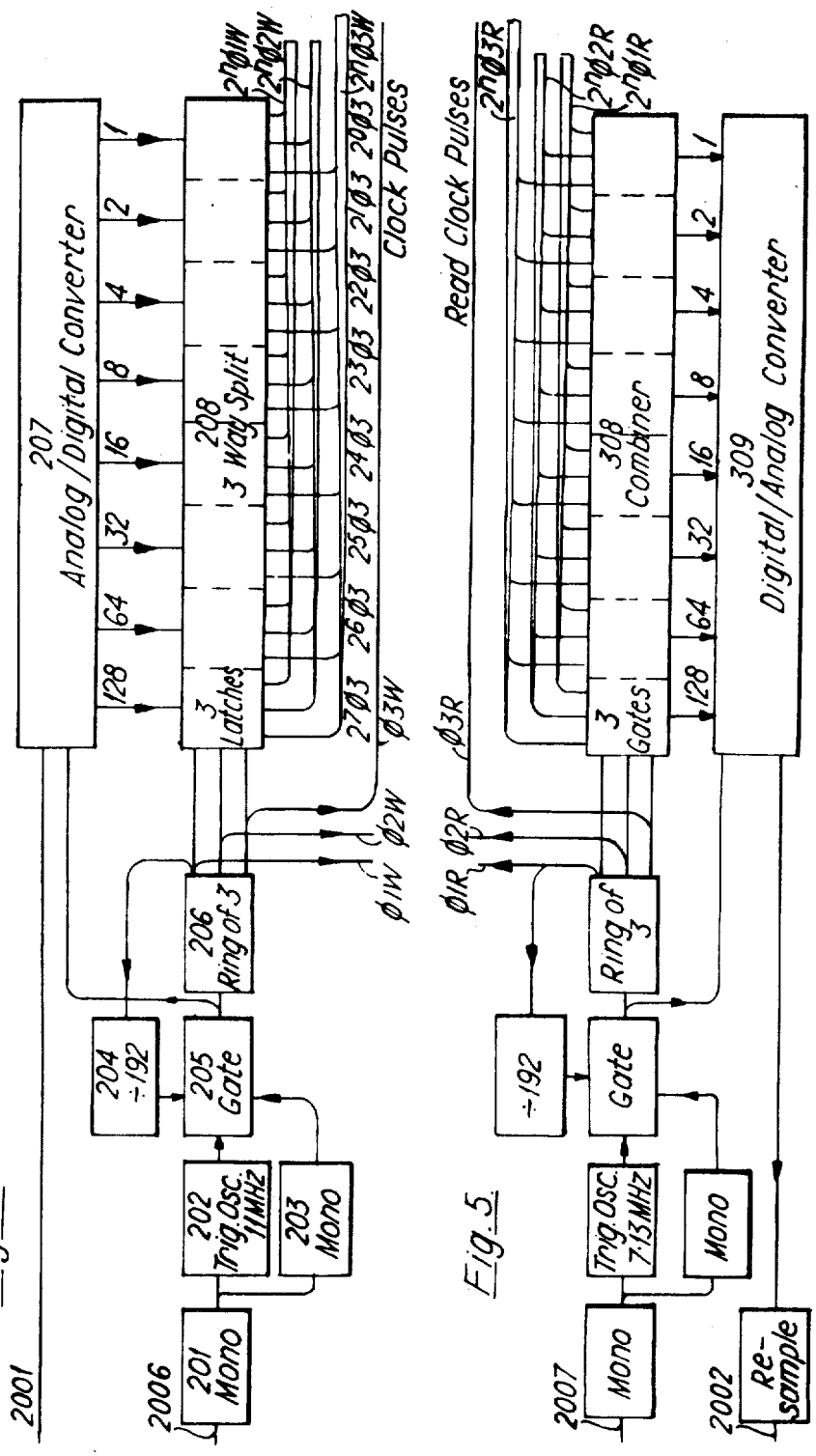

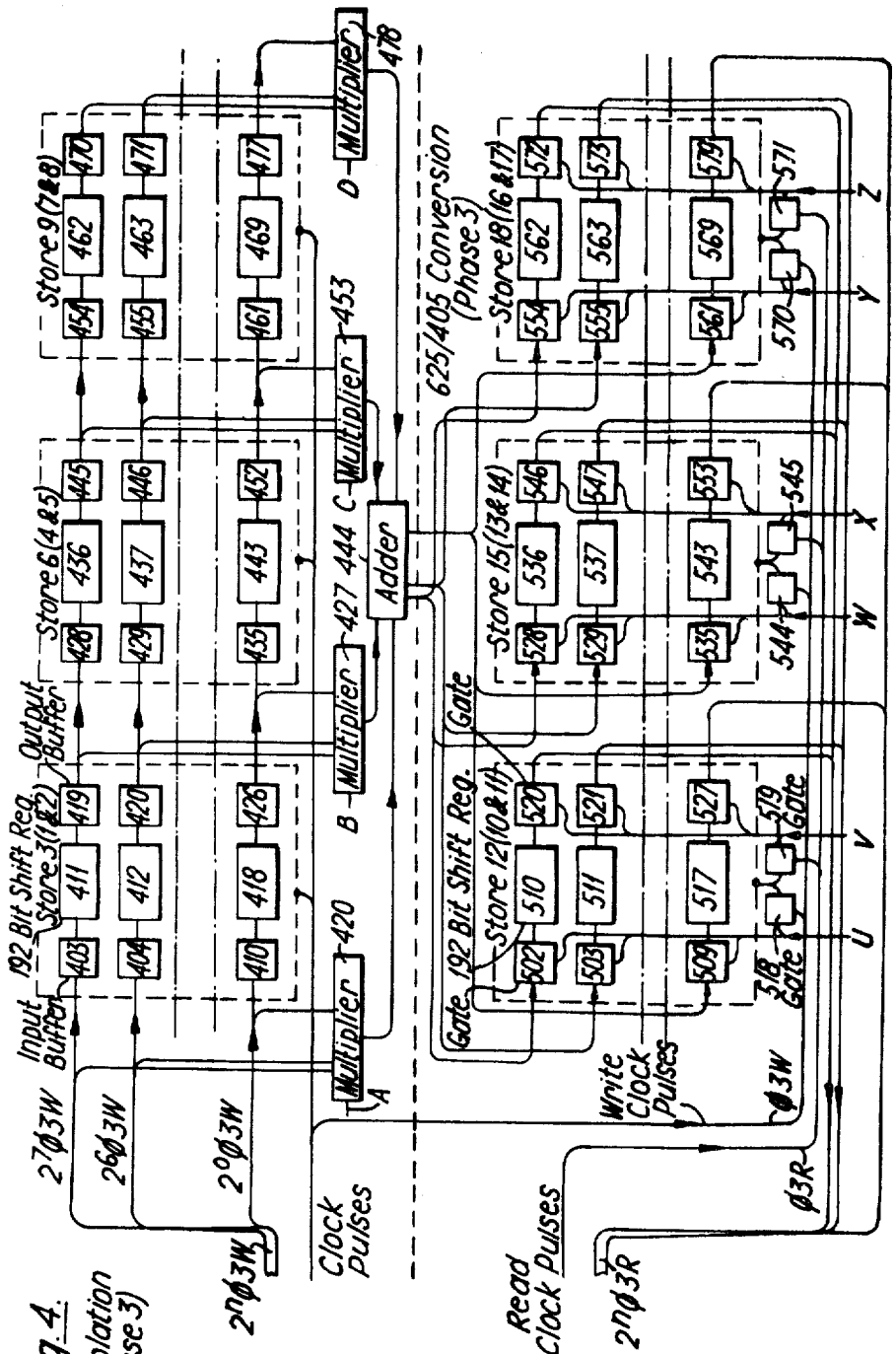

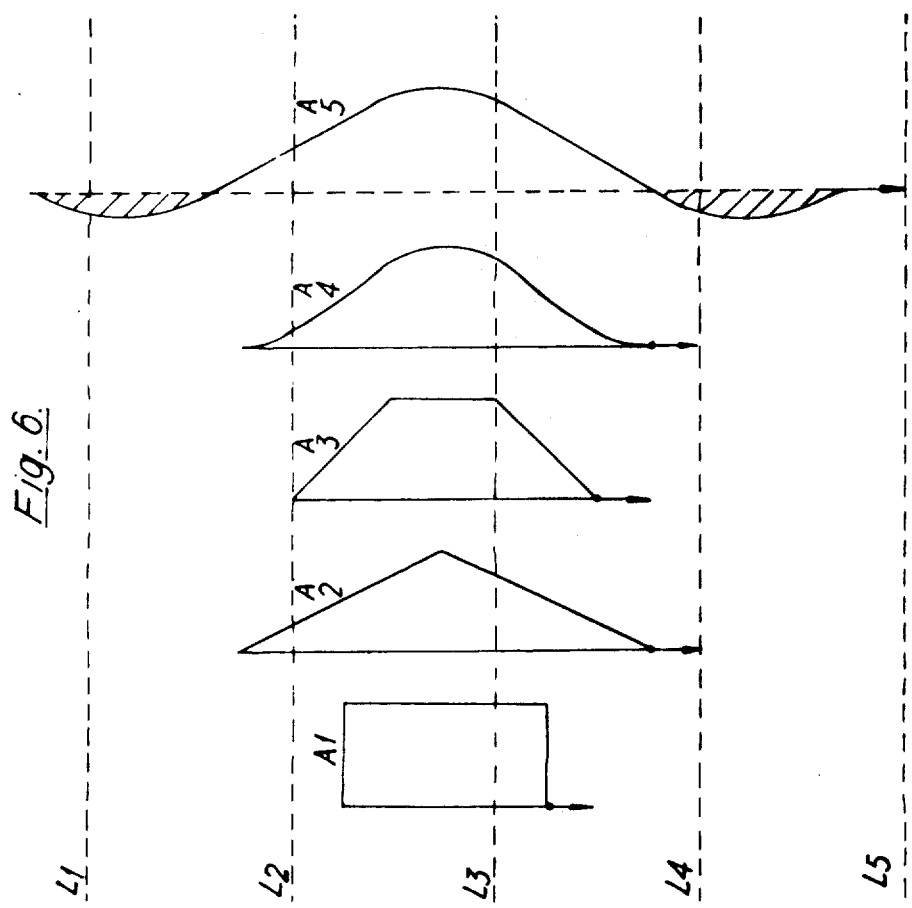

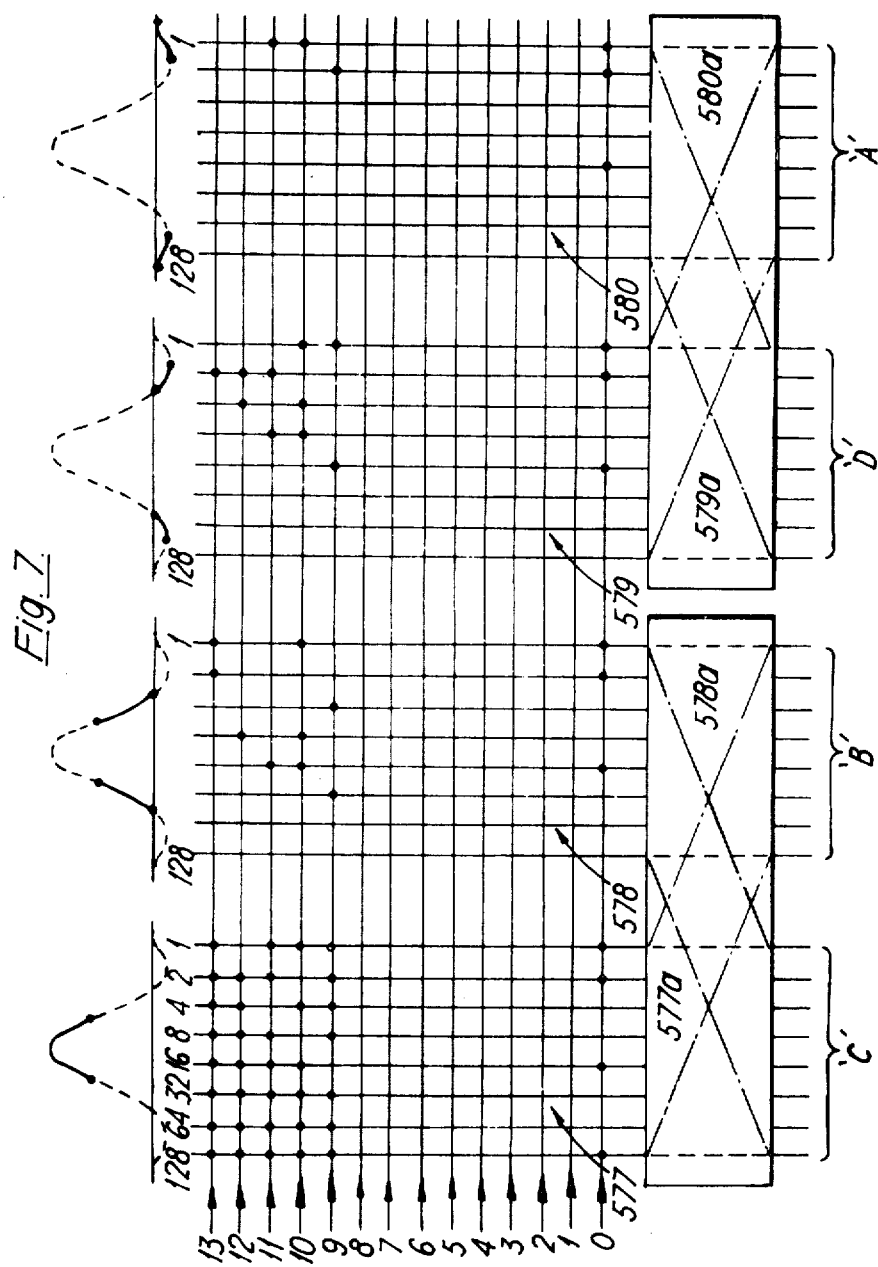

TELEVISION SYSTEMS

This application is a division of my copending application Ser. No. 126,538 filed Mar. 22, 1971, now U.S. Pat. No. 3,742,135.

The present invention relates to television apparatus and to the provision of television apparatus in a new and improved form.

Objects of the invention include the provision of apparatus for the conversion of television signals of a field from a first line standard to an intermediate line standard, the provision of apparatus for the conversion of signals of an intermediate line standard to a second line standard and the provision of apparatus for processing television signals in which use is made of shift registers to store digitised signals and reading means for reading out the stored signals from the shift registers.

The conversion of television signals from one line standard to another involves eliminating the line pattern of the first standard in such a manner that it does not beat with that of the second standard to produce objectionable visual effects.

In the description which follows reference is made to the conversion of television signals of a field. The invention is equally applicable to sequential scanning systems in which each field contains all the lines for the raster and interlaced scanning systems in which each field contains only a half or a third of the lines. In the customary interlaced scanning systems the odd lines for the raster are contained in alternate fields and the even lines in the remaining fields. References made hereinafter to consecutive lines in a field are to be interpreted accordingly.

In accordance with the present invention there is provided apparatus for the conversion of television signals of a field from a first line standard to an intermediate line standard which comprises an input for video input signals of the first line standard, delay means for delaying said video input signals for a total period equal to at least one line repetition period thereof, at least two signal channels, each provided with a multiplier connecting the delay means or the input and the delay means with a signal combining device to supply the combining device with signal information from corresponding parts of consecutive lines, and an interpolator operable to set the multipliers to multiply the signal information passing therethrough to the combining device by coefficients which correspond with the significance of the information in particular lines of the first line standard to information in particular lines of the intermediate line standard, so that the combining device produces video signals for the intermediate line standard. With this apparatus the signals passing along the two or more signal channels correspond with two or more consecutive lines of the field. The signals for one channel may be supplied without delay from the input and the delay means for an apparatus having $n$ channels need not therefore provide a total delay or more than $n - 1$ line repetition periods. A delay means which enables signals having the required delays to be tapped-off may be employed, but is unnecessary as the required delays are all integral multiples, including unity, of the line repetition period. A convenient form of delay means is a set of delay units each one of which has a delay time equal to one line period of the signals of the first standard.

The multiplier operates to modify the value of a signal by a process akin to multiplication by a coefficient. An example of a multiplier which may be used when only positive coefficients are required in an analogue system is a potentiometer. A more elaborate gain control device than a potentiometer may be employed to give negative coefficients and/or to avoid mechanical operation. In a digital system the value of a signal is represented numerically rather than by a signal level and a multiplier of the arithmetic type is required.

In conversion from the first line standard to the intermediate standard is achieved, in effect, by taking at least two consecutive lines of the first standard, using them to produce the required line of the intermediate standard and repeating this operation for every line of the field of the intermediate standard.

In the intermediate line standard, the number of lines per field and the line repetition period are the same as in the first line standard. However the contents of the lines have been changed by the action of the interpolator in a manner dependent upon the interpolation cycle. When the second line standard is to contain less lines than the first standard, it is convenient to provide an interpolator having an interpolation cycle such that the field of the intermediate line standard contains the required picture information for the second line standard in a number of lines equal to the number of lines in the second line standard and the remaining lines of the field are redundant so that a field of the second line standard is obtainable by rejecting them. These redundant lines are conveniently blank, but they may contain spurious signals.

All the information in the lines of the first line standard is considered in the production of the lines of the intermediate and the second standards but the significance attached to them is controlled by the interpolator. At times the information in the two lines on either side of the line of the first standard may even be ignored completely. At other times the information in two lines may simply by averages and that in other lines may be ignored. At other times when the situation is less simple, the interpolator makes appropriate settings of the multipliers.

In the simplest case the apparatus has two signal channels with multipliers set by the interpolator and can take into account the signals passing through the first and second channel as required.

However it is found to be advantageous to provide more than two and preferably four signal channels, e.g. using a delay means in the form of a set of three delay units. With four signal channels, improved derivation of the lines of the intermediate standard is achieved by the interpolation from lines of the first standard. It is indeed found that improved resolution perpendicular to the line direction is obtainable when four lines of the first standard are being considered by giving certain lines a negative significance depending upon the phase relationship of the particular line of the intermediate standard which is being generated to the lines of the first standard. This can be achieved by providing an interpolator which is operable to set the multipliers to multiply the signal information by significance coefficients within a range including negative as well as positive values. The improved resolution is of a kind to be expected by reducing the aperture distortion of the field of the second line standard.

Even though the lines of the first standard have a different slope, in a picture as displayed, from the lines of the second standard it is surprisingly found that the interpolation coefficients may be maintained constant whilst being applied to particular lines of the first standard without significant degradation of picture quality.

Conversion from the intermediate standard to the second standard may be achieved in any convenient manner. For this purpose it is preferred to employ a further apparatus provided in accordance with the present invention, viz., an apparatus for the conversion of television signals of an intermediate line standard, derived by the interpolation of signals of a first line standard, to yield signals of a second line standard, said apparatus comprising a storage device for storing the signals of the intermediate line standard and a reading device for reading from the storage device to produce video output signals of the second line standard.

The storage device receives and stores the video signals supplied thereto and the reading device reads out the stored signals in the order in which they have been received, but at a rate appropriate for the second line standard. The said further apparatus is novel and independently useful. It may be employed for the processing of the signals of an intermediate standard produced by interpolation as herein described or otherwise.

It is of no consequence that the lines of the first and second standards occupy different times or that a receiver operating on the first standard would, for most lines, complete a line scan whilst a receiver operating on the second standard still has a line to complete. Each complete line of the second standard is derived via an interpolation of a set of adjacent lines from a field of the first standard. The requirement for lines having a line duration period appropriate for the second standard is accomplished automatically by the operation of the reading device.

The storage device in a preferred form of the apparatus is provided in the form of a set of storage units connected with the combining device via a distributor system operable to route the video signals from the combining device occurring during line periods of the intermediate line standard to the storage units in turn and the reading device is operable to read from the storage units in turn each over a period corresponding with the line period of the second line standard. A distributor of the electronic switching type is preferable to a distributor of the mechanical switching type. Three storage units is the satisfactory minimum.

In converting to a second line standard in which the line duration period is greater than in the first standard the reading device cannot keep pace with the output of the combining device. The reading device does however catch up with the input to the apparatus in disregarding the redundant lines of the intermediate standard. The conversion from the first to the second standard may of course be achieved without rejecting information from the input signal. All the information of the input signal may be used in the interpolation.

The redundant lines of the intermediate standard could be rejected by arranging for the writing device to erase from the storage device signals belonging to lines which are to be rejected. The rejection is however preferably effected between the combining device and the storage device in order to avoid waste of storage capacity. Accordingly, in a form of apparatus which is preferred when the line repetition period of the second standard is greater than that of the first, the distributor system is operable to interrupt the passage of video signals from the combining device to the storage device during certain line periods of the intermediate line standard so that the number of line periods during which the video signals are routed to the storage units is equal to the number of lines per field in the second line standard.

For the opposite case, where the line repetition period of the second standard is less than that of the first, the insertion of lines into the field of the intermediate standard is required rather than rejection. These additional lines may be generated by using an additional interpolator, set of multipliers and combining devices to supply additional line signals to the storage device.

Thus the invention provides a method of converting television signals of a field from a first line standard to a second line standard which comprises generating signals of an intermediate line standard in which the number of lines per field is the same as the number for the first line standard and in which the signal information in the lines is obtained by interpolation of the signal information in the lines of the first standard, storing the signals of the intermediate line standard in a storage device and reading out the signals, line by line, from the storage device at a rate appropriate for the second line standard. Lines are omitted or inserted depending upon whether the fields of the second standard contain less lines or more lines than the fields of the first standard.

The storage device may be a digital storage device and the apparatus provided with an analogue to digital converter for converting the signals to digital form before they are fed to the storage device. The reading device is then provided between the storage device and a digital to analogue converter. The multipliers may also be of a digital type in which case the analogue to digital converter is provided between the input and the multipliers. Preferably it is provided between the input and the delay means, which for example is a set of digital storage units of the shift register type.

By providing the analogue to digital converter at this preferred position, the apparatus is rendered purely digital in its operation.

It is considered desirable that the increments of signal level should be kept very small and that the resulting complexity of represeinting the signal level of each picture element by several digits, e.g. eight digits, is acceptable. The stores required for construction of the delay means and the storage units, as at present available economically have operating speeds which are inadequate to handle the information at the desired high rate. This difficulty is overcome when the digital converter is operable to provide a digital output (preferably in parallel form) in which the signal level is represented by binary numbers of several digits (eight digits being our present preference) by dividing the digital storage units into N sub-groups each arranged to handle information at 1/N of the rate required overall. Each sub-group may communicate with the store via its own multiplier, combining device and distributor. Typically each sub-group is constituted by a number of sets of stores, each set comprising one store for each level of digit significance.

It will be noted that the active time during which picture information may be present is less than the line repetition period. When the sync pulses for the lines of the field of the second standard are produced by apparatus separate from that hereinbefore described the time which is not used by picture information may be taken into account in order to economise on the storage capacity of the storage device.

As will be appreciated, the present invention provides a novel apparatus for the processing of television signals characterised by an input for the signals in digitised form and a storage device for the digitised signals in the form of one or more digital shift registers provided with a reading device for reading out the stored signals to yield digital output signals which are delayed relative to the input. In a preferred form, the apparatus is characterised by an input for the signals in digitised form, a plurality of storage devices each in the form of one or more digital shift registers for receiving and storing the digitised signals and a reading device for reading out the stored signals to yield digital output signals which are delayed relative to the input signals by a variable amount.

When shift registers are used to store the signals from the multipliers, the information in the unwanted lines may be fed thereto if desired. In this case, the unwanted information is not read out, but is automatically discarded the next time information is fed to the registers concerned.

The following description, in which reference is made to the accompanying drawings is given in order to illustrate the invention. The form of the apparatus specifically described with referencces to FIGS. 1 to 5 is one designed for the conversion of the signals of the fields of a 625 line interlaced system and the field of a 405 line interlaced system, this being the conversion most commonly required in the United Kingdom. Other conversions may be achieved with appropriately modified apparatus.

In the drawings:

FIG. 1 is a simplified block diagram showing the general arrangement of the apparatus, FIGS. 2 to 5 are detailed block diagrams showing the major part of a preferred form of apparatus, FIG. 6 is given in order to facilitate explanation of the manner in which the lines are given different significances in the interpolation, FIG. 7 shows the interpolator used with the apparatus of FIGS. 2 to 5, and FIG. 8 shows the sequencer used with the apparatus of FIGS. 2 to 5.

The apparatus shown in FIG. 1 has a 625 line standard input 1 and a 405 line standard output 2. A sync conversion unit 13 is provided for the production of sync signals for the output in appropriate relationshiip with the sync signals of the input.

Signals containing the picture information are passed through three delay units, 3, 6 and 9, each of which delays the signal by one line repetition period of the 625 standard field. The signals passing through pathways 20, 23, 26 and 29 therefore contain the signal information of four consecutive lines of the input field and are in phase.

Multipliers 402, 427, 453, and 478 in the pathways 20, 23, 26 and 29 respectively multiply the signal information in these pathways by interpolation coefficients set by an interpolator 401. They may be regarded as gain controls.

A combining device 444 adds together the signals from the multipliers to form a signal having an intermediate standard in the sense hereinbefore described the lines of which are passed to stores 12, 15 and 18, used in rotation, by a distributor A actuated by a sequencer 501.

Sequencer 501 also actuates a device D which extracts video signals of the required 405 line standard from the store. Appropriate sync pulses from conversion unit 13 are added to these signals by means of processing device 115 before they pass to the output 2.

In the drawing the distributor and the device D are indicated by switch symbols for clarity but are preferably purely electronic devices or combinations thereof.

As so far described, the apparatus of FIG. 1 may be of the analogue type. For a wholly digital apparatus an analogue to digital converter 207 is positioned where shown in broken lines, the delay units, 3, 6 and 9, the multipliers 402, 427, 453 and 478, the combining device 444 and the stores 12, 15 and 18 are all provided in the form of digital apparatus and the processor P incorporates a digital to analogue converter. The wholly digital apparatus will be described in detail with reference to FIGS. 2 to 5.

Figure 2:
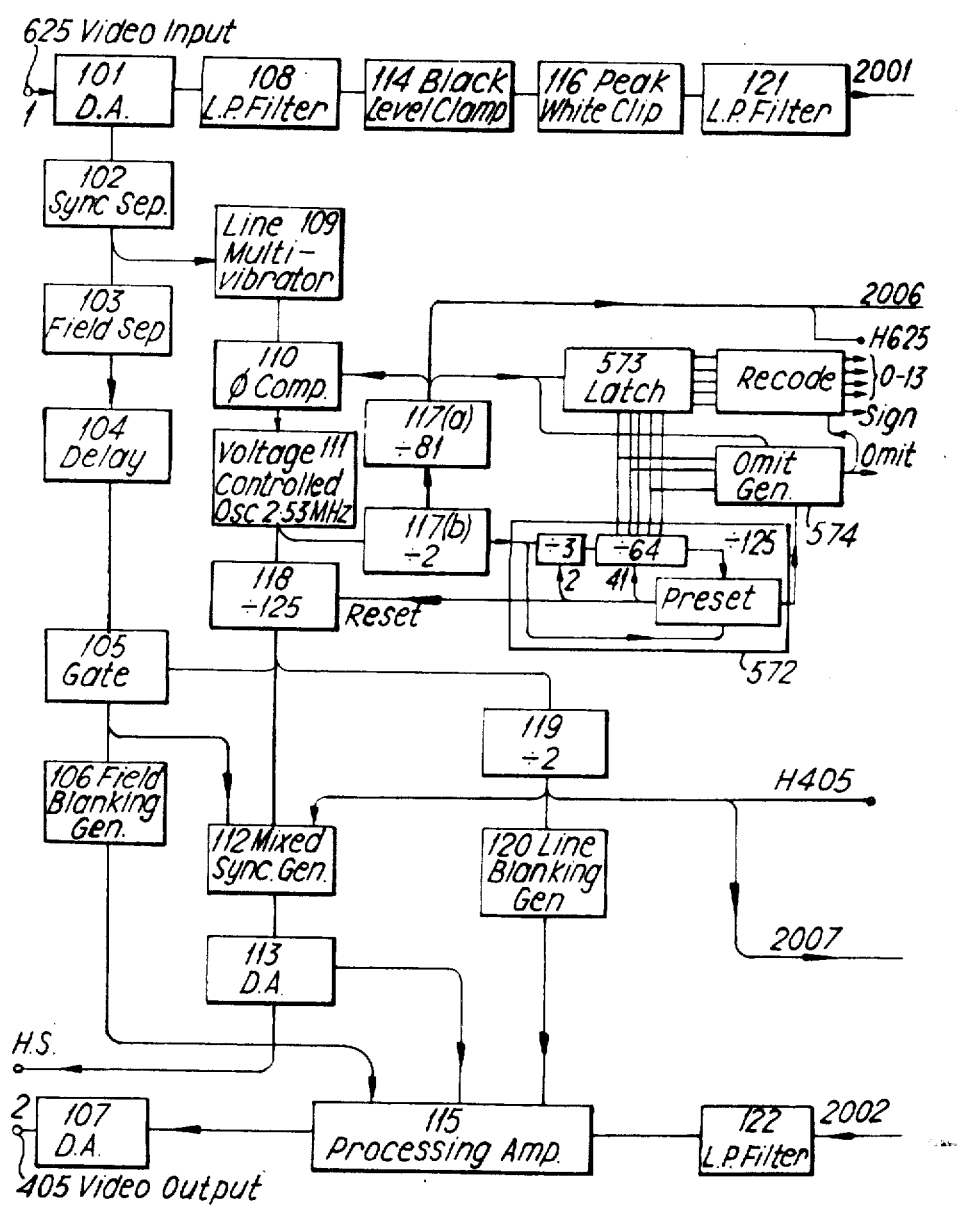

FIG. 2 shows inter alia a synch conversion and video processing unit. This unit provides a signal of the 625 line standard at video output 2001 and adds 405 line sync pulses to the converted (405 lines) signal received at video input 2002 before passing it to output 2. In addition it provides four pulse outputs at H 405 and H 625 for the interpolation generator 401 and the sequencer 501, and at 2006 and 2007 for the analogue to digital converter and the digital to analogue converter. The parts of the video processing unit are numbered 101 to 108, 112 to 116, 119 and 120 to 122 in FIG. 2. Their functions will be readily apparent from FIG. 2. No further explanation is required as the design of such a processing unit is well within the skill of the art.

FIG. 2 also shows an interpolation coefficient generator which will be described hereinafter.

In the analogue to digital converter 207 shown in FIG. 3, the 625 line sync pulses are used to start a monostable 201 and during the time of about 4μs that this is running the output is used to damp the oscillation produced by the tirggered oscillator 202 which normally runs at 11 MHz. At the end of the run the oscillator is restarted in a specific phase and after a further delay of about 4μs determined by monostable 203 during which the oscillation stabilises gate 205 opens to allow this signal firstly to provide clock pulses for the analogue to digital converter 207 and secondly to drive the ring-of-3 206 which provides the three phase clock pulses $\phi1W$, $\phi2W$ and $\phi3W$ (W for write) used by the three-way split 208 and elsewhere. Phase 1 also feeds a scale-of-192 204 which is also used to control gate 205 so ensuring that precisely 192 cycles appear on each of the three phase outputs during each line interval. Each of these signals is a rectangular wave of 1 to 2 mark/space ratio. A similar system operating at 7.13 MHz is used to produce the read clock pulses used to drive the combiner and digital to analogue converter shown in FIG. 5.

It has already been described how the clock pulses for the analogue to digital converter 207 are produced. The video signal which has been clamped, clipped and filtered is converted to a normal binary form with eight digits giving 256 signal levels. The least significant bit represents a change of approximately 3 millivolts. The output from the analogue to digital converter 207 is in parallel form, that is each of the eight bits which together represent the analogue input appear at their separate output terminals simultaneously. The bit rate of each of these outputs is 11 M bits per second, but since this is too fast for available stores it must be decreased and this is achieved by feeding each of these outputs to three latches each clocked by the three phases of $\phi1W$, $\phi2W$, $\phi3W$. By this means the received bits from each output of the analogue to digital converter are sequentially distributed on three separate wires each having a bit rate of 3.67 M bits/second. Since the converter has eight outputs this gives three separate eight bit data highways shown symbolically as $2^n\phi1W$, $2^n\phi2W$ and $2^n\phi3W$, $n$ representing the integers from 0 to 7 and W signifying write. At this point these three highways separate for separate simultaneous processing of their digital information. Apart from the interpolation generator 401, only the apparatus for phase 3 ($\phi$ 3) is shown in FIG. 4. Identical apparatus is provided for the other two phases. Each bit passes along a data highway to an input buffer (403–410) and thence to a 192 bit shift register (411–418). The output from the shift register passes to an output buffer (419–426) to the input buffer (428–435) of a second shift register. This continues until each signal has passed through three shift registers. The shift registers are driven by the same phase clock pulses as were used in the three way split, that is phase 3W.

A bit arriving at the input of a shift register will require 192 clock pulses to progressively move it to the output. Since there are 192 pulses during each line of information the output of each shift register is exactly the same as the input was one line before. The input and output of the first shift register and the outputs of the second and third shift registers at all times represent corresponding points on four consecutive lines of the original 625 line signal vertically above one another. With the luminance of the four points known, being represented by binary digits, the desired luminance at any point between the middle two lines is derived by interpolation. The interpolation process involves, deriving from the phase relationship between the 625 and 405 sync pulses four coefficients whose sum represents unity, multiplying the luminance of each of the four points by its respective coefficient and summing the products so produced.

For this purpose the interpolation generator (FIG. 7) which provides four digital-words each of which represents the coefficient for the multiplier 402, 427, 453, or 478 which it controls and the outputs from the multipliers are summed by the combining device 444.

The interpolated signal of the intermediate standard has a 405 line structure but the length of each line is still 64 microseconds. Only approximately two lines out of every three will be used, more accurately 81 lines out of every 125. The other 44 out of each group of 125 lines will be discarded and the remainder stretched in time to produce a normal line structure. If the signal at this point on each of the three phases were combined, converted to analogue form and displayed on a monitor operating on 625 lines the picture and its structure would appear to be 405 lines but with these lines bunched together in small groups. If the velocity of the field scan were suitably modulated the displayed picture would be indistinguishable from that produced by a 405 line signal.

The next step is the omission of undesired lines and the stretching in time of the remainder. If, when a shift register has been filled, the clock pulses are changed to a lower frequency then the time taken to empty the register will be increased in the same ratio as the higher to the lower clock pulse frequencies. By this means each line may be stretched. In addition by having an extra interval between the last of the higher frequency clock pulses and the start of the lower frequency clock pulses the reproduced line will be equally delayed.

The signal from the adder passes to gates 502–509, 528–535 and 554–561. By keeping all of these gates closed during an unwanted line that may be omitted. The explanation of how this part of the apparatus functions is made easier by assuming that there is an exact two lines out of three relationship between wanted and total number in input lines, and that the shift registers in store 12 are empty. Gates 502–509 and gate 518 open, the former allowing the signals from the adder to pass to store 12 at the same time as the latter gate passes write clock pulses to the same store. At the end of the line all of these gates close and the equivalent gates 528–535 in store 15 open so passing the next line and write clock pulses to shift registers 536–543. At the same time gate 519 opens allowing read clock pulses to pass to the shift registers in store 12 and gates 520–527 also open to allow the output signal to pass to data highway $2^n\phi3R$.

The writing operation of the next line in store 15 is completed and gates 528–535 and 544 shut. At this time two-thirds of the reading from store 12 has been completed. The reading operation of the remainder of the information from store 12 continues until all the information has been read out when gates 520–527 and 511 shut and gates 546–553 and 545 in store 15 open to start the reading operation from that store. When about one-third of the latter information has been read out one line has been omitted from the writing operation as is required and the conditions are back to the initial assumed starting states. The only remaining part of the cycle not yet described is that the reading operation continues in store 15 until completed.

The need for store 18 has not yet been explained. It is required for line ratios between 3 : 2 and 2 : 1. For conversion from a 625 line standard to a 405 line standard the ratio is 125 : 81.

Figure 8:
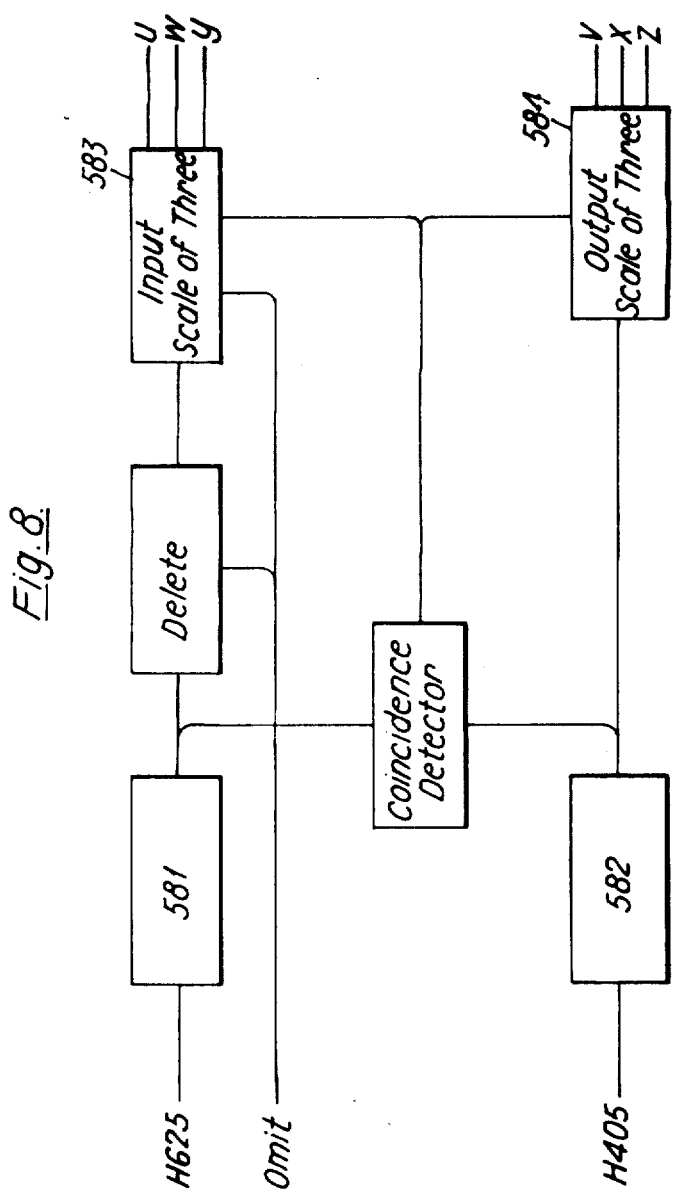

Control signals U to Z for the read and write gates 518, 519, 544, 545, 570 and 571 are provided by a sequencer shown in FIG. 8.

The input and output buffers in stores 3, 6 and 9 may be identical with the input and output gates in stores 12, 15 and 18, i.e. the store modules may all be identical.

The data highways $2^m\phi3R$, $2^m\phi2R$ and $2^m\phi1R$ for the three phases pass to combiner 308 shown in FIG. 5 which performs the reverse operation to the three-way split 208 and the combined signals then pass to the digital to analogue converter 309. The analogue signal thus obtained is then re-sampled and passed to the input 2002 of the sync conversion and video processing unit shown in FIG 2 where it is filtered and processed to add sync pulses for the 405 line standard before passing to output 2.

The choice of interpolation coefficients is explained with reference to FIG. 6. In the Figure are shown five consecutive lines L1, L2, L3, L4 and L5 of the field of the first standard. For convenience the interpolation is considered in terms of a scanning aperture movable downwards in the direction of the arrows as the lines of the fields of the first and intermediate standards change in their phase relationship. In all cases the order of significance of the two lines involved is given by the horizontal intercepts of the aperture with the lines.

Aperture A1 is a rectangle of precisely one line interval in height. Aperture A1 gives a significance only to one line at a time. In the case shown only line L3 is being given significance by its associated multiplier.

Aperture A2 is an isosceles triangle whose base has a height of two line intervals.

Aperture A3 is a trapezium of maximum height 1.5 lines and average height 1 line.

Aperture A4 is two line intervals in height and has a width which varies with height in a sine squared (sometimes also referred to as a raised cosine waveform).

Aperture A5 is more complex. It is just four line intervals in height and so can give significance to four lines simultaneously. It has a central portion which gives a positive significance to lines in the central region between two negative portions shown hatched which give a negative significance.

Apertures A1 and A5 alone give good resolution of verticals. Aperture A1 however gives sloping lines which are unacceptably stepped. The slight stepping which occurs with Aperture A5 is acceptable.

It is therefore preferred that the interpolation factors applied to the multipliers by the interpolation generator 401, should give the effect of Aperture A5. The function sin $x/x$ is a convenient mathematical function for design purposes but would require excessive storage so other functions of a damped cyclic nature which are visually similar in graphical form, including stepped or ramped functions having empirically chosen levels or slopes may be employed.

Referring again to FIG. 2, the output of the voltage controlled oscillator 111 is divided by 125 and the resulting signal is used to control the twice-lined frequency transitions of the output syncs and blanking waveforms and in addition, after dividing by two, controls the line frequency transitions. The output of the oscillator 111 also drives a divide-by-two counter 117b which in turn drives a divide-by-81, 117a. The output of this divider 117a is compared with the line pulses produced by the line multivibrator 109 in the pahse comparator 110 which controls the oscillator 111. The blocks 110, 111, 117b and 117a constitute a phase-locked loop whose output frequency, 625Hz, is identical with that of the line synchronising pulses of the input video signal.

A second output of 2.53/2 MHz from the divide-by-two 117b provides the input to a counter 572. The counter 572 consists of a divide-by-three, 574, followed by a divide-by-64, 575, of binary form with a sensing device 572a which presents both the divide-by-three and the divide-by-64 to a predetermined count from which the input pulses progressively subtract. It is probably simplest to consider counter 572 as a 41.⅔ counter from which a third is subtracted at each input pulse thus giving 125 states of which the last is zero.

It is important that the zero state should not be fugitive but should last for the same period as the other states. Fugitive states corresponding to counts of 27 and above can be tolerated providing allowance is made for them.

The state of the binary counters, other than the most significant one, is passed to a latch 573, which is sampled at the input line frequency rate H625. The output of this latch represents the relative phasing of the output to the input synchronising pulses. Only 81 of the 125 counter states are used for producing lines appropriate to the 405 line standard and this corresponds with counts of 26 to 0 inclusive of the divide-by-64 counter.

It is found that ignoring the fractional parts (⅓ or ⅔) of the count pattern will provide acceptably small interpolation steps whilst decreasing to one-third the number of interpolation patterns that are required.

The omit generator 574 produces a pulse whenever the 625 line signal occurs other than during the time defined by the range of states 0 to 26 inclusive.

If simple linear interpolation were required, the output of the latch, which is in binary form, could be used as one multiplier coefficient the second being produced by subtracting the first coefficient from 26.

More complex interpolation is achieved in the apparatus by using a read-only memory. Since preferred interpolation functions are symmetrical the amount of storage required in the read-only memory may be halved by recoding the 0 to 26 inclusive states on a 0 to 13 inclusive basis (viz. one of 14 predetermined values) plus a switching signal (+ or −). The box recode 576 has 14 output lines corresponding to numbers 0 to 13 already mentioned plus a sign output. When the omit pulse occurs the 14 output lines are all rendered inoperative.

The 14 output lines drive a read-only memory having four matrices 577, 578, 579, 580 shown in FIG. 7. Each maytrix is formed of fourteen linear conductors on one face of an insulating sheet and eight linear conductors on the opposite face. At any position where two conductors cross, they may be joined together by passing a diode through the sheet. Thus by suitably positioning diode pins (shown by dots in FIG. 7) the matrices may be caused to yield binary signals of up to eight digits to serve as interpolation coefficients A, B, C and D whenever one of the fourteen output lines is conducting.

The diodes are positioned to give an interpolation curve similar to that shown at A5 in FIG. 6. Each matrix corresponds with only a part of the curve. For convenience of explanation the curve is repeated above each matrix in FIG. 7, the part or parts of the curve to which the matrix relates being shown as a continuous line and the remainder as a broken line. The switching signal (+ or −) from recode 576 selects the multiplier to which the coefficient from each matrix is supplied. With a positive signal the matrices provide outputs C, B, D and A respectively. With a negative signal they provide outputs B, C, A and D. The changeover devices operated by the switching signal are shown at 577a, 578a, 579a and 580a in FIG. 7.

The number of digits in the signals used as interpolation coefficients is the same, in the apparatus illustrated, as the number of digits used to represent signal amplitude. This identity is not essential however.

FIG. 8 shows the sequencer (cf. 501 in FIG. 1) for providing signals U, V, W, X, Y and Z for controlling the gates shown in FIG. 4.

The line pulses for both the input and output signals are used to produce narrow pulses in their respective pulse formers 581 and 582. For conversion from 625 to 405 lines only approximately two out of every three lines of the intermediate standard are used and it is necessary to arrange that the progressive switching from one store to the next follows the correct pattern.

When an omit pulse occurs it prevents the 625 line-formed pulse from passing to the input scale-of-three, 583, and also prevents this scale-of-three from feeding an 'on' signal to any of the stores. When the omit pulse is not present the scale-of-three changes to its next state whenever an input-formed pulse arrives.

The output scale-of-three 584 changes to its next state as each 405 line-formed pulse arrives so sequentially bringing into operation the reading of the information from the stores.

Every 125 input lines and 81 output lines, a coincidence will occur between the two formed pulses. This coincidence is useed to reset the scales-of-three should they get out of step. By this means the simultaneous writing into, and reading from, each store is prevented.

The apparatus as so far described in directly suitable for the conversion of the luminance signal component of a colour signal to provide a monochrome output. A digital or analogue chrominance conversion unit may be added for the separate processing of chrominance signals. In a preferred arrangement the chrominance is converted into B - Y and R - Y digital signals for interpolation. The chrominance definition may be lower than the luminance definition and adequate storage capacity is readily obtained without recourse to polyphase systems. Adequate results are given by an apparatus having eight store modules additional to the 18 modules used in the delay units and storage units of FIG. 4.

As will be understood, the specific form of apparatus described herein is given for purposes of illustration only and various departures may be made therefrom by those skilled in the art, all within the ambit of the invention.

I claim:

1. An apparatus for the processing of digitized input signals of high bit rate which comprises storage elements arranged to provide $n$ similar paths, means operable to distribute the digitized signal between said paths and write them in the storage elements thereof so that the bit rate within a single path is one $n$th of said high bit rate and the total bit rate of the writing is said high bit rate, means for reading out the signals from the storage elements to provide $n$ digital outputs, one from each path, and means for combining the $n$ digital outputs to provide a delayed replica of the digitized input signals having said high bit rate.

2. An apparatus for the processing of a digitized input signal of high bit rate which comprises shift registers arranged to provide $n$ similar paths, means for distributing the digitized signals between said paths, first clocking means for shifting the incoming bits into the shift registers at one $n$ th of the bit rate of said input signal, second clocking means for shifting the bits out of the shift register at a rate of one $n$ th of a desired output bit rate, and means for combining the bits shifted out of the shift registers to provide an output having said desired output bit rate, at least one of the clocking means having clocking-free time-gaps and said output bit rate being different from the bit rate of said input signal.

* * * * *